(12) United States Patent
Fite

(10) Patent No.: US 7,731,858 B2
(45) Date of Patent: Jun. 8, 2010

(54) METHOD FOR LIQUID PURIFICATION USING A MOLECULAR REACTION UNIT

(76) Inventor: Robert D. Fite, 03179 Spring Dr., Boyne Falls, MI (US) 49713

( * ) Notice: Subject to any disclaimer, the term of this patent is extended or adjusted under 35 U.S.C. 154(b) by 39 days.

(21) Appl. No.: 12/134,718

(22) Filed: Jun. 6, 2008

(65) Prior Publication Data

US 2008/0230486 A1   Sep. 25, 2008

Related U.S. Application Data

(62) Division of application No. 10/905,039, filed on Dec. 13, 2004, now Pat. No. 7,255,789.

(51) Int. Cl.
  *C02F 1/70*   (2006.01)
  *C02F 1/72*   (2006.01)
(52) U.S. Cl. .................. 210/757; 210/763; 210/807
(58) Field of Classification Search ................ 210/763, 210/757, 807
  See application file for complete search history.

(56) References Cited

U.S. PATENT DOCUMENTS

| 4,661,264 | A | 4/1987 | Goody, Jr. |
| 4,899,057 | A | 2/1990 | Koji |
| 5,190,659 | A | 3/1993 | Wang |
| 5,205,932 | A * | 4/1993 | Solomon et al. ............ 210/264 |
| 5,376,281 | A | 12/1994 | Safta |
| 5,653,877 | A | 8/1997 | Mark |
| 5,874,741 | A | 2/1999 | Matschke |
| 5,951,869 | A * | 9/1999 | Heskett ..................... 210/638 |
| 6,419,821 | B1 | 7/2002 | Gadgil |
| 6,439,888 | B1 | 8/2002 | Boutoussov |
| 6,468,433 | B1 | 10/2002 | Tribelski |
| 6,469,322 | B1 | 10/2002 | Srivastava |
| 6,524,447 | B1 | 2/2003 | Carmignani |
| 6,555,011 | B1 | 4/2003 | Tribelsky |
| 6,579,495 | B1 | 6/2003 | Maiden |
| 6,767,458 | B2 | 7/2004 | Safta |
| 6,812,500 | B2 | 11/2004 | Reeh |
| 6,816,520 | B1 | 11/2004 | Tulloch |
| 6,828,576 | B2 | 12/2004 | Spivak |
| 2002/0074559 | A1 | 6/2002 | Dowling |
| 2003/0060747 | A1 | 3/2003 | Fries |
| 2004/0020862 | A1 | 2/2004 | Baca |
| 2004/0222163 | A1 | 11/2004 | Saccomanno |

\* cited by examiner

*Primary Examiner*—Matthew O Savage

(57) ABSTRACT

A method for modifying contaminants in a liquid comprising a reaction chamber where the liquid interacts with an ionization reaction material which causes contaminants to reduce or oxidize into harmless compounds.

3 Claims, 9 Drawing Sheets

METHOD FOR LIQUID PURIFICATION USING A MOLECULAR REACTION UNIT

This application is a divisional of U.S. patent application Ser. No. 10/905,039, filed on Dec. 13, 2004, now U.S. Pat. No. 7,255,789.

BACKGROUND OF THE INVENTION

Presently, the quality of the global pure drinking water supply is decreasing at a faster rate than the population is expanding. The United Nations International children's Educational Foundation (UNICEF) estimates that 20,000 to 30,000 children die every day from waterborne diseases such as typhoid, malaria, e-coli, cholera and many other contaminants. These contaminants can also include such things as salts, halogens, organic solvents, pesticides, fertilizers, industrial chemicals, bacteria, protozoa, fungi and other foreign matters.

The extensive use of fertilizers and pesticides by farmers, runoffs from major animal husbandry sites, contamination spills by industries, the dumping of raw sewage into our lakes and streams and the significant number of landfill sites have caused many contaminants to percolate down through the soil and into the underlying water tables throughout the world. The result is that today many more wells and springs are now testing positive for a wide array of toxins and contaminants harmful to human, animal and plant health.

In many areas of the world, and in the United States of America, public water supply systems are monitored for diseases and toxins on a regular basis to assure the public that the water is safe to drink. However, cases are still reported in the U.S. of contaminated water supply systems. Furthermore the majority of the water piping and distribution systems in the U.S., and internationally, are many decades old and as the water passes from a main purification site to an end user, the water can pickup additional contaminants and toxins from the aging water distribution systems.

There have been a variety of attempts to provide purified water at a user or business' point of entry and/or point of use site. One such device is known as the Britta. It is a single stage filter utilizing the laws of gravity and a carbon block held in a container. Water is poured into a top holding container and gravity slowly draws the water through the carbon block to a lower container for consumption. Carbon does reduce some toxic chemicals and gases from water however it does not purify the water. This device is also greatly limited by the capacity of water that it can produce in a 24-hour period. It most certainly would not produce enough filtered water to supply a family of four with enough drinking and cooking water for an entire day.

There are other products available that provide two stage filtering devices consisting of a carbon block filtration and a paper filter surrounding or in line with the carbon block. However, these systems do not address the issue of microorganisms in the water, which can bypass the filtration systems.

Yet another product available to consumers is a device called the Pur water filter. This system utilizes a small and low wattage ultraviolet (UV) lamp and a carbon block filter. The UV light is known to kill microorganisms in the air and in water. Unfortunately, the UV lamp deteriorates over time to the point that it cannot produce the necessary wavelength to kill microorganisms in the water. Furthermore, the system does not provide a means to know when the UV lamp has deteriorated. As such, the end user may think that the device is adequately killing microorganisms when in fact the UV lamp has become useless as a biocide. The use of a laser for producing UV light for treating water has also been described by Goudy in U.S. Pat. No. 4,661,264

Another additional means of purifying water has been the use of what is known as KDF 85 and/or KDF 55 as a biocide and is described by Heskett in U.S. Pat. No. 5,951,869. This process utilizes a compound that is basically copper and zinc that creates and ion exchange and chelating (clumping together) producing properties in the water. This material is primarily used in large municipal water treating systems however there have been some attempts to have the KDF 85 or KDF 55 material impregnated onto a paper filter for point of use water treatment systems with limited success.

While all of the above presented means provide some degree for improving the water supply, none of them fully purify the water in an economical and efficient manner. As such, a technical need still exists to purify water, air or other fluids quickly, efficiently, over a long-term use and do so economically.

BRIEF DESCRIPTION OF THE DRAWINGS

The invention will be better understood by reading the detailed description of the preferred embodiments of the invention along with a review of the drawings, in which.

DETAILED DESCRIPTION OF THE INVENTION

Figure 1:
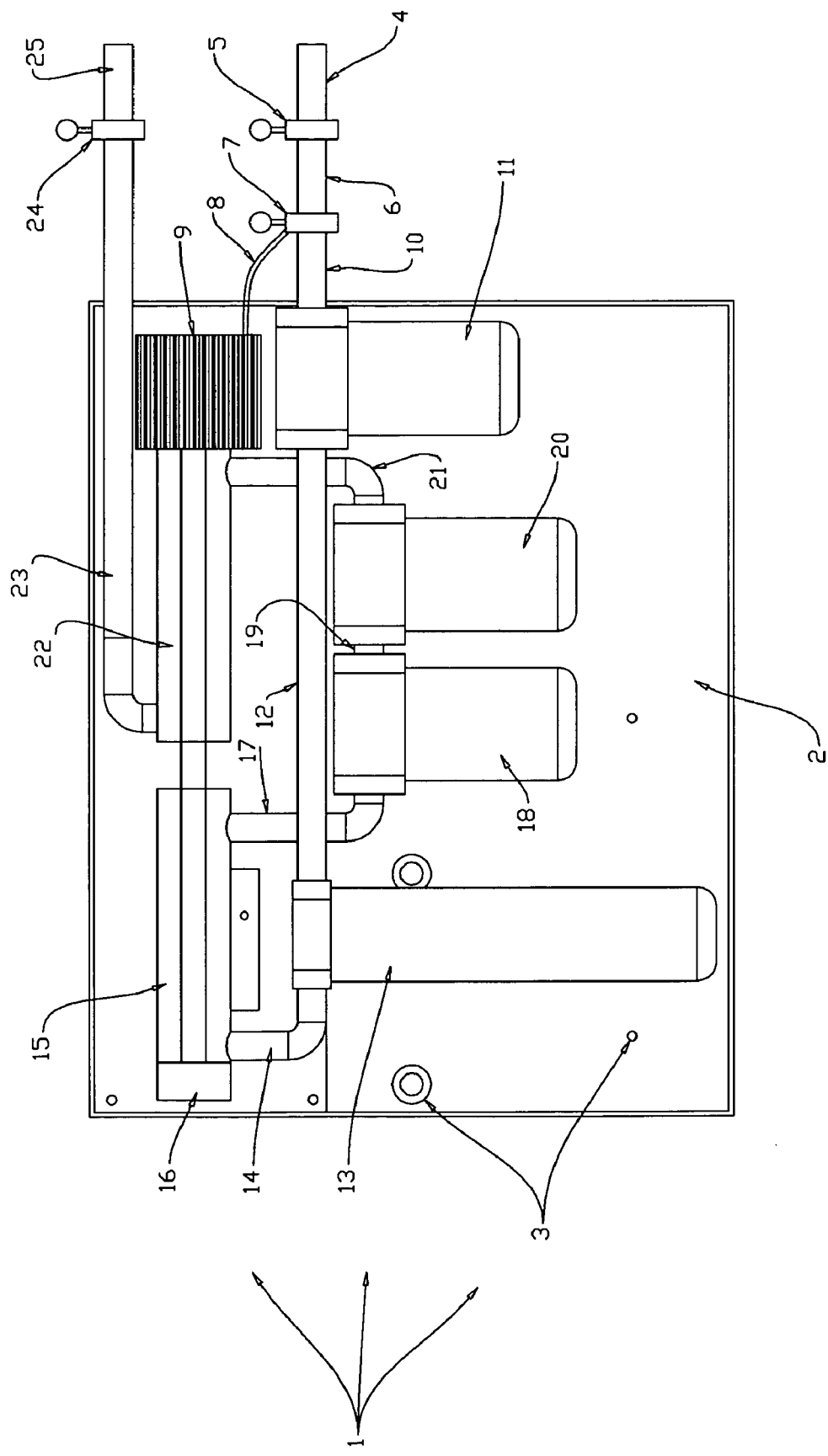
FIG. 1 is an overall view of the various components of the invention.

Reference will now be made in detail to the description of the invention as illustrated in the drawings. Although the preferred embodiments of the invention will be described in connection with these drawings, there is no intent to limit the invention to the embodiment or embodiments disclosed therein. On the contrary, the intent is to include all alternatives, modifications and equivalents included within the spirit and scope of the invention as defined by the appended claims.

Furthermore, the order of the itemized steps in FIG. 1 are not meant to limit the scope of the invention to the specific itemized order of those steps, but rather to include those steps in any relevant order including any alternatives, modifications and equivalents included within the spirit and scope of the invention as defined by the appended claims.

To aid in the understanding of the invention, examples of some of the specific itemized steps are provided for clarification purposes only. In particular, some of the examples use water for the liquid being purified, however, these examples are not meant to limit the invention to only water, but rather to include any alternative, modification and equivalents included within the spirit and scope of the invention as defined by the appended claims.

The present invention provides a method and apparatus for treating water or other liquid to assure that the water or liquid is of a high degree of purity. The origin of the water or liquid can be from any source such as municipal water supply systems, independent well systems, tanker truck or rail car, a lake, a river, desalinized sea water, collected rail water or other like source.

FIG. 1 depicts an overall view of the liquid treating apparatus 1 without the cover for the apparatus. The cover is shown later in FIG. 7. The liquid treating apparatus 1 contains a base 2 to which elements of the liquid treating apparatus are connected. The base 2 is constructed with a plurality of mounting holes 3 such that the liquid treating apparatus can be mounted to a wall (not shown) or a frame (not shown). Other equally effective mounting systems are well known in the art.

The water or other liquid (not shown) flows from a pressurized source (not shown) through the inlet pipe 4 through a pressure regulator 5 through a first transfer pipe 6 and then through a flow indicator 7. The pressure regulator 5 assures that the liquid is maintained at or below a predetermined pressure setting for optimal operating efficiency of the liquid treating apparatus 1. The flow meter 7 is connected 8 to the laser light source generator 9 such that the laser light source generator 9 only generates a laser light (not shown) in the ultraviolet range when the flow indicator 7 indicates that liquid is flowing through the liquid treating apparatus 1. As the liquid exits the flow indicator the liquid travels through a second transfer pipe 10 to the first stage of the liquid treatment apparatus 1.

The first stage of the liquid treatment apparatus 1 is the primary collective filtration unit 11. The primary collective filtration unit 11 (shown in detail in FIG. 2) contains a 5.0 micron filter whose primary purpose is to prevent any chemical, particulate matter or other media 5.0 microns or larger from traveling any further than this stage in the liquid treating apparatus 1.

The liquid then exits the primary collective filtration unit 11 and travels through a third transfer pipe 12 to the second stage of the liquid treatment apparatus 1. The second stage of the liquid treatment apparatus 1 is a molecular reaction unit 13, called the Hydro-Media Reaction Chamber, that functions as an effective biocide. The details and design of the molecular reaction unit 13 is discussed in greater detail in relation to FIG. 3 later in this description of the invention.

The liquid then exits the molecular reaction unit 13 and flows through a fourth transfer pipe 14 to the third stage of the liquid treatment apparatus 1. The third stage of liquid treatment apparatus is a first photolytic laser chamber 15 in which the liquid is subjected to ultraviolet light in the 100 to 300 nanometer range produced by a laser light source generator 9 and received by a laser light receiver 16. This process acts as a biocide by altering the contaminants so that they can be filtered out later and removes volatile organic compounds. The ultraviolet light destroys organic compounds by breaking the covalent bonds in the chemical thereby forming free radicals which react with water and break down into harmless substances. Details of the first and second photolytic light chambers 15 and 22 are shown later in FIG. 4.

Figure 5:
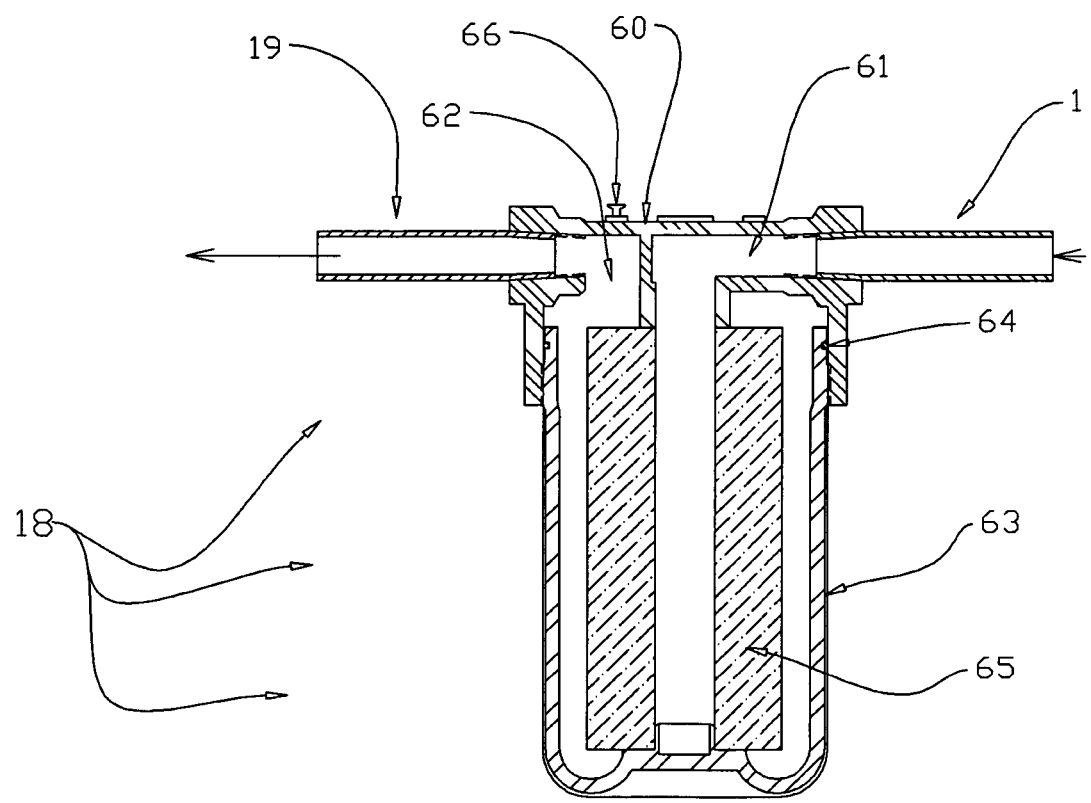
FIG. 5 is a cross-sectional view of the second collective filtration unit used in the embodiment of FIG. 1.

The liquid then exits the first photolytic laser chamber 15 through a fifth transfer pipe 17 and enters a secondary collective filtration unit 18. The secondary collective filtration unit 18 utilizes a 0.5 micron filter which traps or collects all of the destroyed microorganisms that were affected by the first photolytic laser chamber 15 and any particulate matter or other media that is 0.5 microns in size or larger. Details of the secondary collective filtration unit 18 are shown in FIG. 5.

Figure 6:
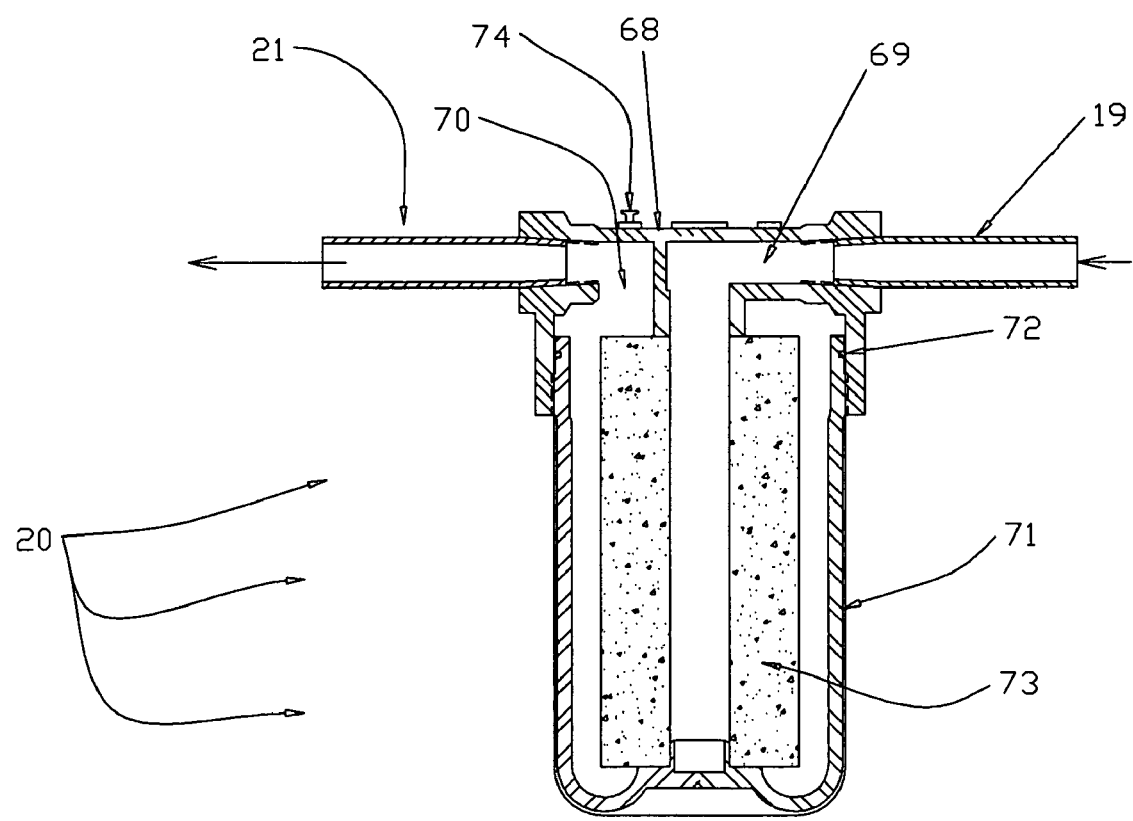
FIG. 6 is a cross-sectional view of the carbon filter used in the embodiment of FIG. 1.

The liquid then exits the secondary collective filtration unit 18 and travels through a sixth transfer pipe 19 to a carbon filtration unit 20. The carbon filtration unit 20 utilizes a pharmaceutical grade granular activated carbon filter. This unit removes odors, chlorine, benzenes and other aromatic ring structures, pesticides and many other volatile organic hydrocarbons that may be found in various combinations in water and/or other liquids. The granular configuration of the activated carbon provides an effective method for maintaining a desired liquid flow rate with maximum beneficial results in eliminating the aforementioned odors and compounds. Details of the carbon filtration unit 20 are shown in FIG. 6.

The liquid then exits the carbon filtration unit 20 through a seventh transfer pipe 21 and enters a second photolytic laser chamber 22. The second photolytic laser chamber 22 also operates in the 100 to 300 nanometer range. This second photolytic laser chamber 22 is the final stage in the liquid treatment apparatus 1 and assures that the liquid and/or water leaving the unit is free from microorganisms by subjecting the liquid or water to a second ultraviolet light process identical to the first photolytic laser chamber 15. This provides additional protection to overcome any effects of colonization or of filtration failure. The water or other liquid then exits the unit through an eighth transfer pipe 23.

Figure 8:
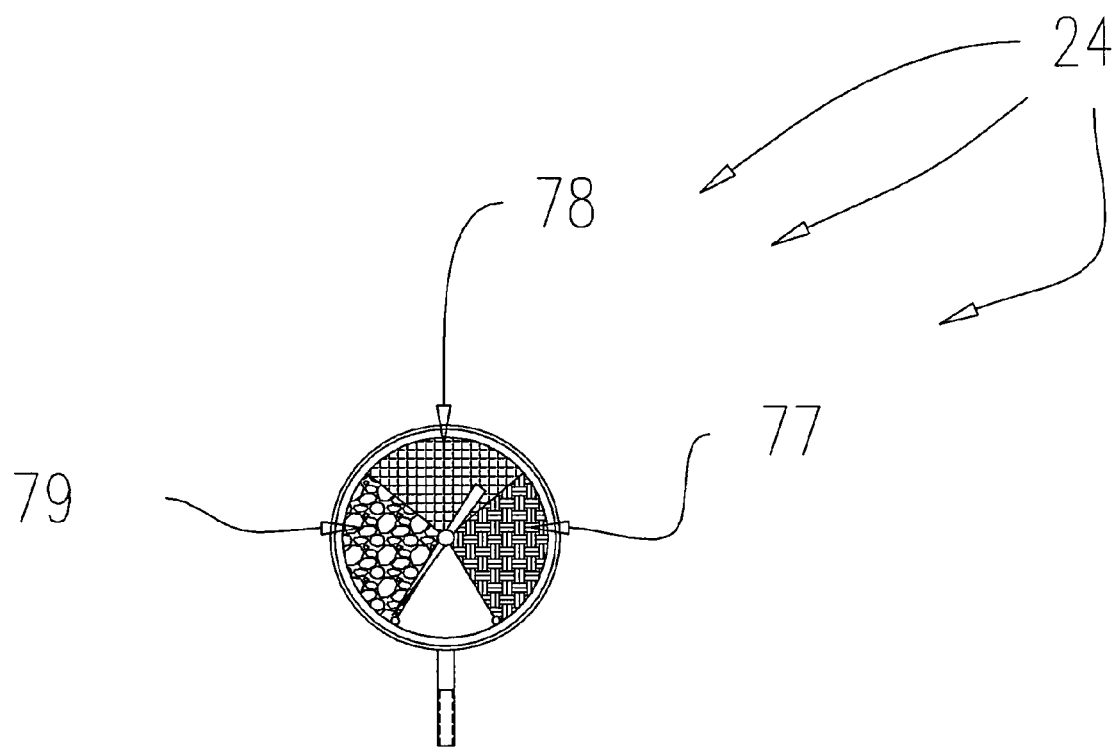
FIG. 8 is a planer view of the pressure gauge.

The eighth transfer pipe 23 is then connected to a pressure gage 24 which is in turn connected to the out going liquid supply line 25. The pressure gage 24 is color coded in red, yellow and green zones. When the pressure gage 24 indicates that the liquid pressure in the liquid treatment apparatus 1 is in the green zone, the filters do not have to be replaced. When the pressure gage 24 indicates that the liquid pressure is in the yellow zone, it is time to prepare for changing the filters or to change the filters. When the pressure gage 24 indicates that the liquid pressure is in the red zone, the filters should be replaced. Details of the pressure gage 24 are shown in FIG. 8.

Figure 2:
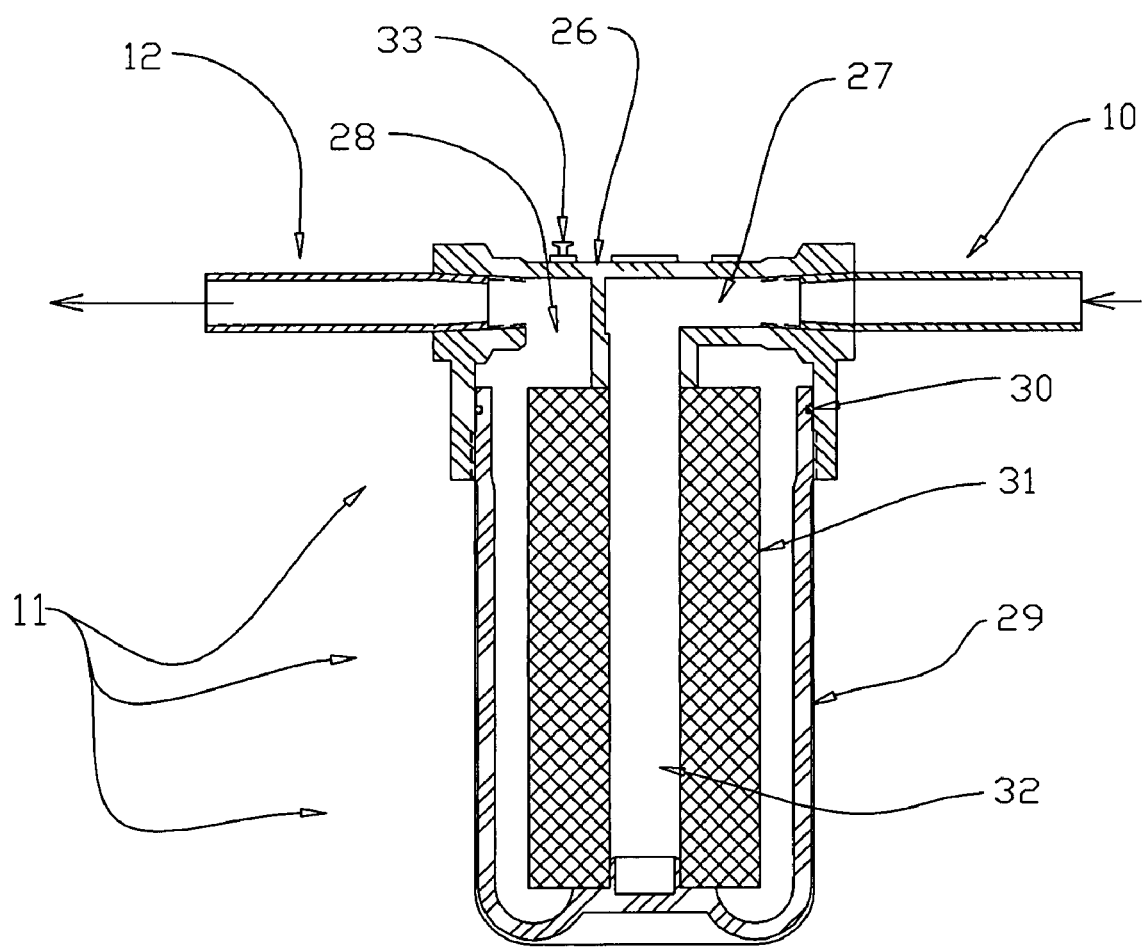
FIG. 2 is a cross-sectional view of the first collective filtration unit used in the embodiment of FIG. 1.

FIG. 2 depicts a cross-sectional view of the primary collection filtration unit 11. This unit consists of a cap 26 with a liquid inlet chamber 27 and a liquid outlet chamber 28. The cap 26 is attached to the removable primary collection filtration body 29 with an o-ring 30 between the cap 26 and the removable filtration body 29 to prevent liquid leakage. Inside the primary collection filtration unit 11 is a 5.0 micron filter 31 for the collection of contaminants 5.0 microns in size or larger. In operation, the liquid flows through the second transfer pipe 10 into the liquid inlet chamber 27 and into the center of the filter 32. The liquid then passes through the filter 31 trapping any objects 5.0 microns in size or larger and exits the collection filtration body 29 through the outlet chamber 28 and the third transfer pipe 12 attached to the cap 26. The cap 26 also has a bleeder valve 33 for bleeding off excess air when the unit is initialized or after replacing the filter 31.

Figure 3:
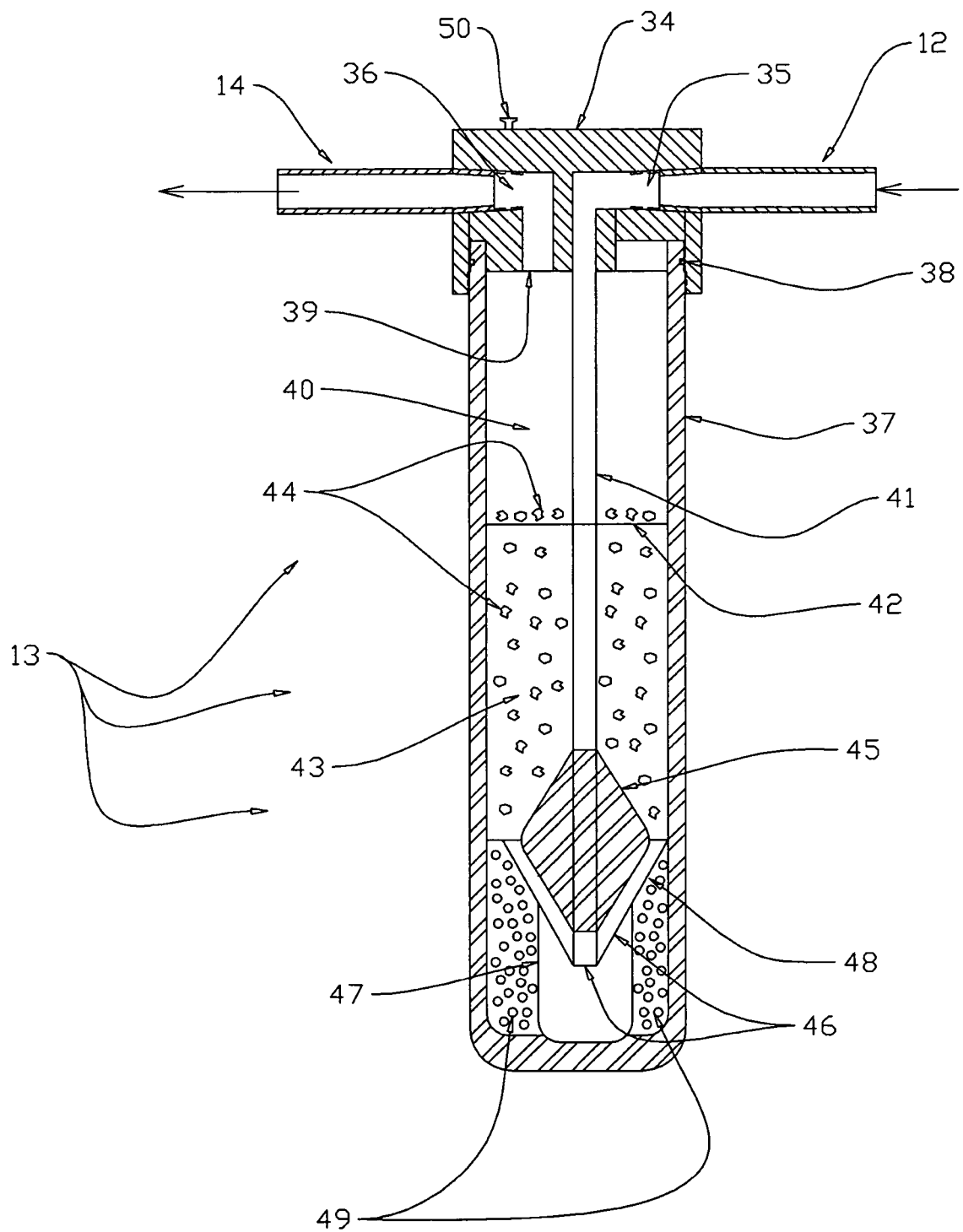
FIG. 3 is a cross-sectional view of the molecular reaction chamber used in the embodiment of FIG. 1.

FIG. 3 shows a sectional view of the molecular reaction unit 13. The molecular reaction unit 13 has an upper cap 34 with a liquid inlet chamber 35 and a liquid outlet chamber 36. The third transfer pipe 12 is connected to the liquid inlet chamber 35 and the fourth transfer pipe 14 is connected to the liquid outlet chamber 36. The cap 34 is secured to a removable reaction chamber body 37 with an o-ring 38 between the cap 34 and the reaction chamber body 37. A filter pad 39, preferably polypropylene or nylon, separates the interior of the upper reaction chamber 40 and the outlet chamber 36 located in the cap 34. Attached to the cap 34 is an internal supply tube 41 that extends down to almost the base of the reaction chamber body 37 and within but not touching the conical screen 46 as shown in FIG. 3. Attached near the center of the internal supply tube 41 is a middle mesh screen 42, preferably made of stainless steel that separates the upper reaction chamber 40 from the lower reaction chamber 43. Placed inside of both the upper and lower reaction chambers 40 and 43 is a reaction material 44, preferably a material called KDF 85 and/or KDF 55 as identified and described by Heskett in U.S. Pat. No. 5,951,869. However, other reaction materials 44 are available that could be utilized in place of the KDF 85 and/or KDF 55 and/or in conjunction with the KDF reaction materials 44. Fixedly attached to the internal supply tube 41 near its base within but not in contact with the conical screen 46 as shown in FIG. 3 is a solid dual funnel shaped object 45 called the dual funnel. At the base of the internal supply tube 41 is a conically shaped mesh screen 46 as shown in FIG. 3, preferably made of stainless steel that covers the internal supply tube opening and wraps up and around the cylindrically shaped deflector cup 47 shown in FIG. 3 and is fixedly attached to the top of the deflector cup 47. The mesh screen 46 assures that the reaction material 44 stays above the deflector cup 47 in the lower reaction chamber 43 in order to assure that the reaction material 44 operates in a turbulent manner with the liquid in the lower reaction chamber 43 when the liquid is flowing through the liquid treatment apparatus 1. Also attached to the deflector cup 47 is the lower chamber funnel 48. Surrounding the deflector cup 47 is a media bed 49 used to fill in the space between the deflector cup 47, the lower chamber funnel 48 and the reaction chamber body 37. The media bed 49 is a man made gravel of consistent size and shape. The cap 34 also has a bleeder valve 50 to release excess air when the unit is initialized or the ionization material 44 is replaced.

The operation of the molecular reaction unit 13 will now be described in detail. Water or other liquid under pressure enters the molecular reaction unit 13 through the liquid inlet chamber 35 and travels down the internal supply tube 41 where the liquid exits the internal supply tube after passing through a mesh screen 46. The liquid is then directed upward by the shape of the deflector cup 47. As the liquid travels upward it again must pass through the mesh screen 46 going between the base of the internal supply tube 41 and the top of the deflector cup 47. The mesh screen 46 prevents any reactive material from going into the deflector cup 47. As the liquid passes between the lower chamber funnel 48 and the dual funnel 45, the liquid gains speed and force due to the restriction of the opening between the lower chamber funnel 48 and the dual funnel 45. The force of the liquid exiting the dual funnel 45 and the lower chamber funnel 48 causes the reaction material 44 to go into turbulent suspension with the liquid. As the liquid rises in the molecular reaction unit 13, the turbulence slows due to the greater opening in the upper and lower reaction chambers 40 and 43. The middle mesh screen 42 traps the reaction material 44 into the lower reaction chamber 43. The reaction material 44 in the upper reaction chambers 40 stays in non-turbulent suspension near the middle mesh screen 42. In use, the reaction material 44 exchanges electrons with contaminants within the liquid thereby causing either an oxidation effect or a reduction effect on the contaminants which causes the contaminants to change into a harmless form that can be filtered out later. The liquid then rises to the top of the reaction unit 13, passes through the filter pad 39 which keeps all of the reaction material 44 in the upper reaction chamber 40 and the liquid then exits through the outlet chamber 36 into the fourth transfer pipe 14.

Figure 9:
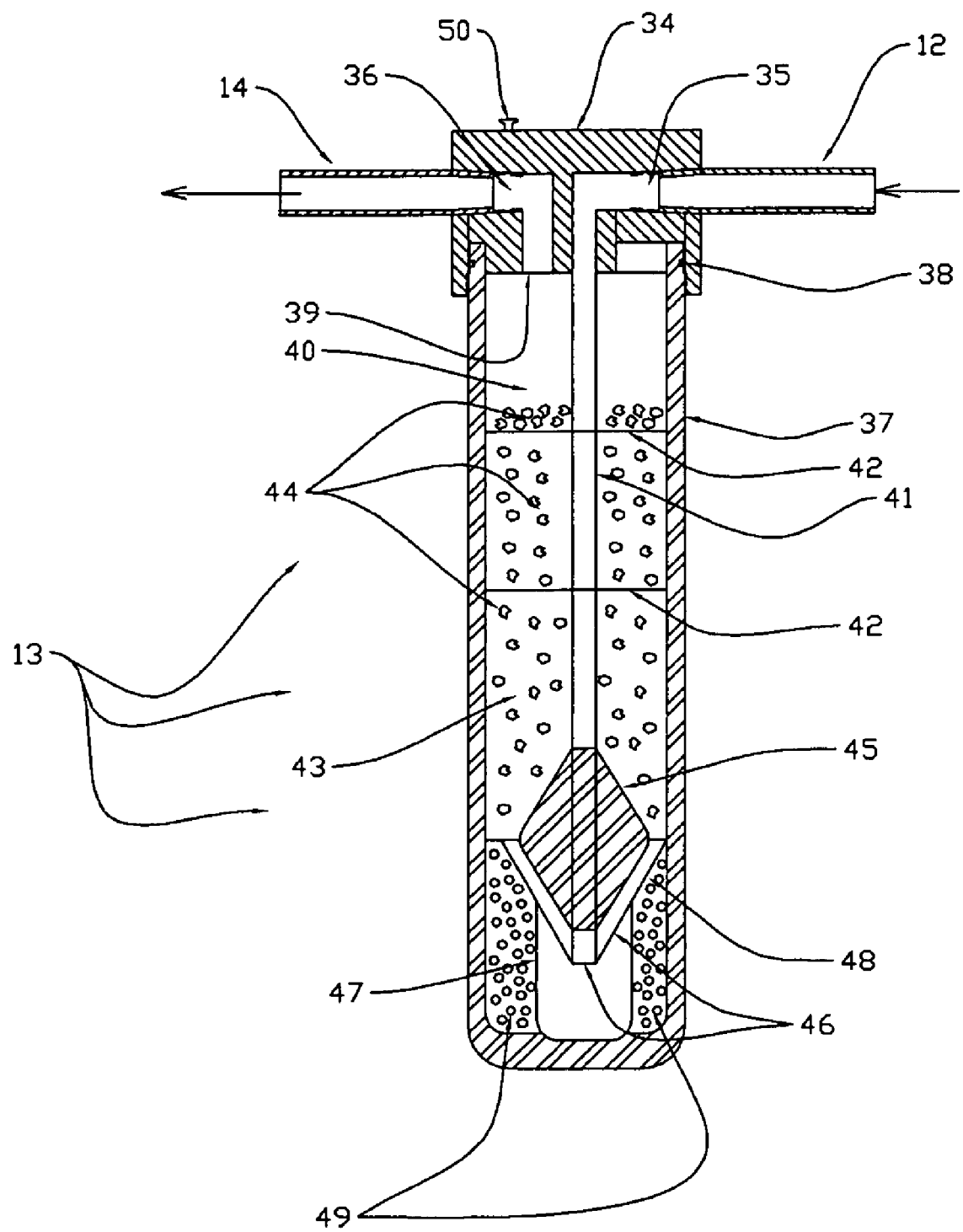
FIG. 9 is a cross sectional planar view of the molecular reaction chamber depicting a plurality of internal mesh screens.

In an alternate embodiment of the molecular reaction unit 13, there can be a plurality of additional mesh screens 42 between the original mesh screen 42 and the cap 34. This would create additional reaction chambers shown in FIG. 9 in which additional reactive materials 44 could be placed. The additional reactive chambers and reactive materials can be additional or alternative reaction materials 44 other than KDF 85 and/or KDF 55 that would operate in addition to or as a substitute for the first reaction materials 44. Some of the additional reactive materials 44 may require that the molecular reaction unit 13 be periodically back flushed in order to cleanse the molecular reaction unit 13.

Figure 4:
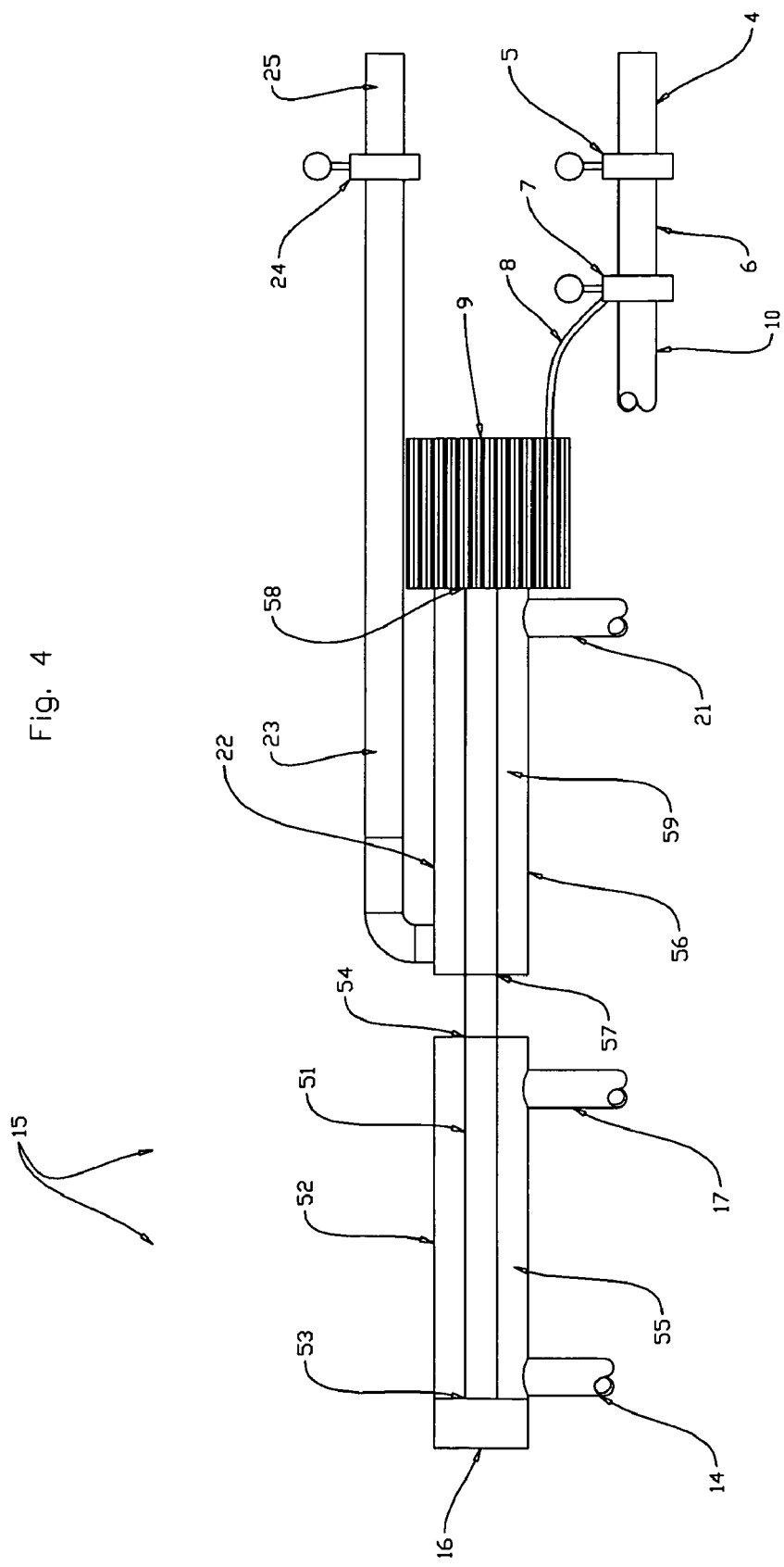
FIG. 4 is a planer view of the first and second photolytic light chambers used in the embodiment of FIG. 1.

FIG. 4 depicts the preferred embodiment of the design of the first and second photolytic light chambers 15 and 22. On one end of the second photolytic light chamber 22 is the laser light source generator 9 and on one end of the first photolytic light chamber 15 is the laser light receiver 16. In between the generator 9 and the receiver 16 is a continuous hollow quartz tube 51 through which the laser light (not shown) travels in operation. A first tube 52 surrounds a first portion of the quartz tube 51 and is sealed around the quartz tube at both ends of the tube 53 and 54. There is a space 55 through which the liquid will pass around the quartz tube 51 when the unit is in operation. This creates the first photolytic light chamber 15. A second tube 56 surrounds a second portion of the quartz tube 51 and is sealed 57 and 58 at both ends of the tube 56 around the quartz tube 51. There is a space 59 between the quartz tube 51 and the tube 56 through which the liquid will pass around the quartz tube 51. The spaces 55 and 59 are the chambers through which the liquid passes and becomes exposed to the ultraviolet laser light (not shown) which is generated by the laser light generator 9 and received by the laser light receiver 16.

In the first and second photolytic light chambers 15 and 22, as the liquid flows under pressure as indicated by the flow meter 7 attached to the first transfer pipe 6, the flow meter 6 sends a signal through the connection 8 to the laser light generator 9 which activates the laser light. A laser light, in the 100 to 300 nanometer range, travels through the inside of the quartz tube 51 to the laser light receiver 16. As the liquid flows through the spaces 55 and 59 in the photolytic light chambers 15 and 22, the liquid is exposed to the laser light in the 100 to 300 nanometer range. This range of light is known to act as an effective biocide and to reduce metallic salts by altering contaminants into harmless components which can be filtered out later. The light also destroys organic compounds by forming free radicals from the compounds which then react with water to break down into harmless substances.

When the liquid or water stops flowing as indicated by the flow meter 7, the laser light generator 9 shuts off the laser light source so that the laser light source 9 and the power consumption is only used when there is liquid flowing through the system. In addition, the laser light generator 9 can be set to operate in a specific range such as 185 or 254 nanometers, or is can be set to oscillate or switch between two or more nanometer ranges for optimum performance. Some of the more obvious advantages to this design is the use of a single source of light for a creating a multitude of exposures and the ability to target a range of ultraviolet light on the liquid to be treated as opposed to a single wavelength. In addition, an ultraviolet light produced by a laser light source will not degenerate over time as does an ultraviolet lamp thus providing a long and economical useful life of the unit.

In an alternative embodiment to the photolytic light chambers 15 and 22, there is only a short piece of quartz rod 51 or other lens like material that connects the end of the first photolytic light chamber 15 to the end of the second photolytic light chamber 22 and allows for the passing of the laser light in the 100 to 300 nanometer range, without inhibiting the laser light spectrum, from the first photolytic light chamber 15 to the second photolytic light chamber 22. Usage of a lens or other device attached between the two photolytic chambers allows transfer of the laser beam through both chambers simultaneously and also denies crossover contamination of the liquid. Thus, instead of the liquid being exposed to the ultraviolet light radiating outward from the quartz tube 51, the liquid is exposed directly to the ultraviolet laser light inside of the photolytic light chambers 15 and 22. In addition, the lens or a thin piece of the rod 51 could be placed in front of the laser light generator 9 and in front of the laser light receiver 16 which would prevent any direct conductive connection between the liquid and the laser light generator 9 and/or the laser light receiver 16. In another alternate embodiment, the inside of the first and second tubes 52 and 56 can be modified for the desired reflective capabilities allowing for greater exposure of the liquid to the desired ultraviolet light range thereby achieving a more through biocide coverage of the liquid. In a further embodiment, the first photolytic light chamber 15 can be placed in a horizontal position and the second photolytic light chamber 22 placed in a vertical position with a reflective material used to bend the laser light from a horizontal position to a vertical position.

As the liquid exits the first photolytic light chamber 15, the liquid travels through a fifth transfer pipe 17 to the secondary collective filtration unit 18 shown in the cross-section view in FIG. 5. The secondary collective filtration unit 18 has a cap 60 with a liquid inlet chamber 61 and a liquid outlet chamber 62. The cap 60 also has a bleeder valve 66 to release excess air when the liquid treatment apparatus 1 is initialized or the filter 65 is replaced. Between the cap 60 and the removable filter body 63, there is an o-ring 64 for sealing the cap 60 to the body 63. Inside of the filter body 63, there is a 0.5 micron filter 65. As a liquid enters the filter body 63 through the water inlet chamber 61, the liquid is forced to pass through the 0.5 micron filter 65 before passing out through the water outlet chamber 62 and through the sixth transfer pipe 19. This filtration process deals with the smallest particulates and microorganisms. Due to the aggressiveness of the combination of the ionization unit 13 and the first photolytic light chamber 15, the possibility of colonization of any microorganisms is significantly reduced.

Upon exiting the secondary collective filtration unit 18, the liquid travels to the carbon filtration unit 20 shown in a cross-sectional view in FIG. 6. The carbon filtration unit 20 has a cap 68 with a liquid inlet chamber 69 and a liquid outlet chamber 70. The cap 68 also has a bleeder valve 74 to release excess air when the liquid treatment apparatus 1 is initialized and/or the activated carbon filter 73 is replaced. Between the cap 68 and the removable carbon filter body 71 there is an o-ring 72 for sealing the filter assembly 20 from any leakage. Inside of the carbon filter body 71 there is a pharmaceutical grade granular activated carbon filter 73. As the liquid enters the carbon filter body 71 the liquid is forced to pass through the activated carbon filter 73 and exits out of the liquid outlet chamber 70 and through the seventh transfer pipe 21. The activated carbon granular filter 73 removes odors, chlorine, herbicides, benzenes and other aromatic ring structures, pesticides and many other volatile organic hydrocarbons that may be present in various water sources, including municipal water supplies, as the water moves through the carbon filtration unit 20.

Upon exiting the carbon filtration unit 20, the liquid travels to the second photolytic light chamber 22 shown in FIGS. 1 and 4. This final stage in the liquid purification process is a final ultraviolet light laser chamber 22 that operates in the same manner as described in the first photolytic light chamber 15 above. This second photolytic light chamber 22 assures that the liquid is free of any microorganisms by providing a secondary ultraviolet light treatment to overcome any effects of colonization and/or filtration failure that may have occurred in the prior treatment stages.

Figure 7:
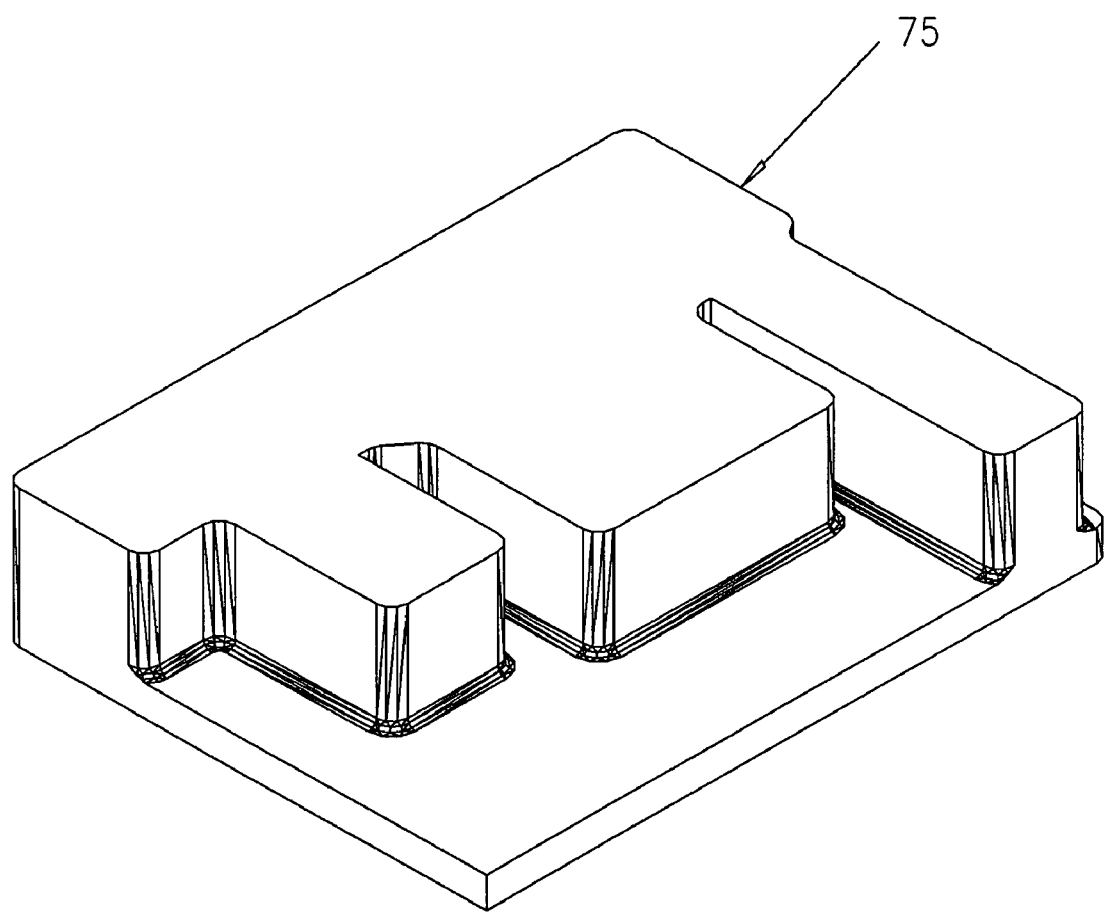
FIG. 7 is a view of the cover that covers and protects the entire unit show in FIG. 1.

FIG. 7 depicts the cover 75 for the liquid treating apparatus 1. The cover is secured to the base 2 with screws or other attachment means (not shown) to keep dust and dirt out and to prevent people or animals from coming in unnecessary contact with the components of the liquid treatment apparatus 1. This cover may be partially or fully clear or transparent and/or have a sight window present in the cover 75 allowing visual opportunity available for people to monitor the liquid treatment apparatus 1 in operation.

FIG. 8 depicts the pressure gage 24 where in the gage 24 is colored coded into three zones, zone A 77 in which the filters 31 and 65 are functioning properly, zone B 78 in which it is time to prepare to change the filters 31 and 65 or to change the filters 31 and 65 and zone C 79 wherein the filters 31 and 65 should be changed.

I claim:

1. A method for modifying contaminants in a liquid comprising the steps of:
    a. supplying said liquid under pressure into a molecular reaction unit-proximate a base of said molecular reaction unit via an internal supply tube;
    b. passing said liquid through a conical mesh screen into said base of said molecular reaction unit, said base causing said liquid to flow between a media bed and a dual funnel causing said liquid to increase in velocity and go into turbulent flow upon exiting said media bed and said dual funnel;
    c. exposing said liquid in turbulent flow to a reaction material, said reaction material causing said contaminants to oxidize and/or reduce;
    d. exiting said liquid from said molecular reaction unit; and
    e. keeping said reaction material in said molecular reaction unit.

2. The method for modifying contaminants in a liquid as defined in claim 1, comprising:
    a. creating a plurality of separate levels within said molecular reaction unit by the use of mesh screens; and
    b. supplying each said level with a different type of reaction material for causing oxidation and/or reduction of said contaminants in said liquid.

3. The method for modifying contaminants in a liquid as defined in claim 1, comprising creating an upper and lower level within said molecular reaction unit by the use of a mesh screen, said liquid being in turbulent flow in said lower level and said liquid being in non-turbulent flow in said upper level.

* * * * *